(No Model.)  2 Sheets—Sheet 1.

H. W. POTTER.
ROTARY ENGINE.

No. 254,044. Patented Feb. 21, 1882.

Witnesses:
Franck L. Ouraud
A. R. Brown

Inventor.
Henry W. Potter
/s/ J. C. Tasker (No Model.)

H. W. POTTER.
ROTARY ENGINE.

No. 254,044. Patented Feb. 21, 1882.

2 Sheets—Sheet 2.

Witnesses
Franck L. Durand
A. R. Brown

Inventor
Henry W. Potter
per J. C. Parker

UNITED STATES PATENT OFFICE.

HENRY W. POTTER, OF TITUSVILLE, PENNSYLVANIA.

ROTARY ENGINE.

SPECIFICATION forming part of Letters Patent No. 254,044, dated February 21, 1882.

Application filed August 29, 1881. (No model.)

*To all whom it may concern:*

Be it known that I, HENRY W. POTTER, a citizen of the United States of America, residing at Titusville, in the county of Crawford and State of Pennsylvania, have invented certain new and useful Improvements in Rotary Engines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to rotary steam-engines, the object being to provide a simple and convenient arrangement of devices for transferring the frictional wear from the inner surfaces of the steam cylinder or case to a crank-pin and to the boxes by which the pistons are connected with said pin, upon which they are caused to revolve with an inner slotted cylinder, that is journaled eccentrically to said crank-pin and outer cylindrical case, which pin and case are concentric with each other.

The invention consists in the construction and arrangement of parts, whereby tight joints are formed and the surfaces of the cylinders protected from the effects of frictional wear without the employment of the ordinary packing or lubricants, as hereinafter more fully set forth.

Figure 1:
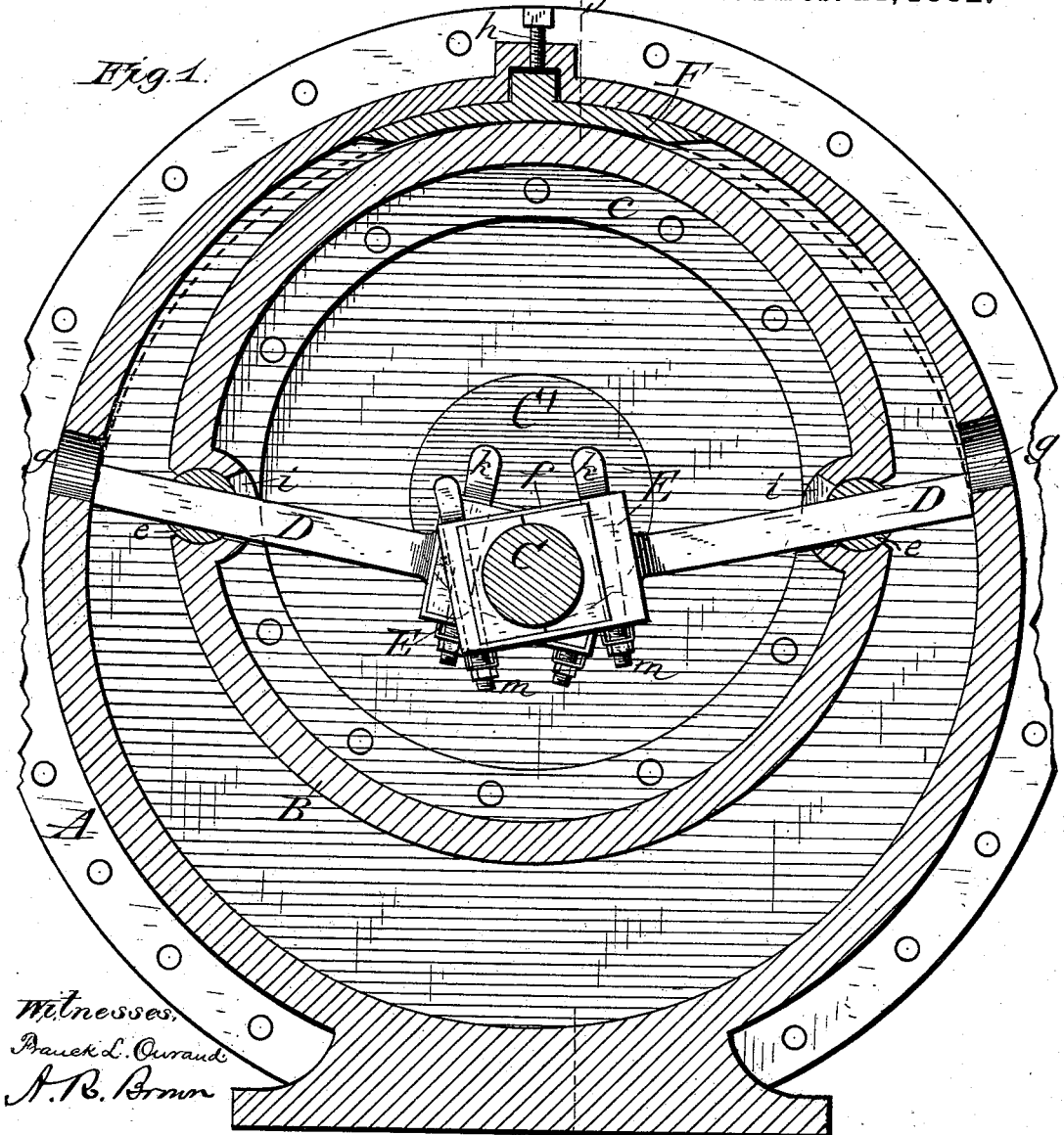
Figures 3, 4:
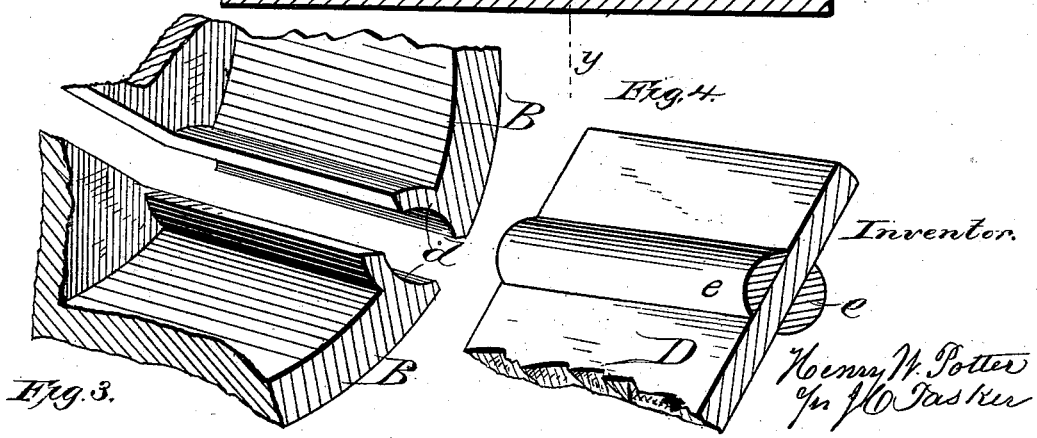
Figure 2:
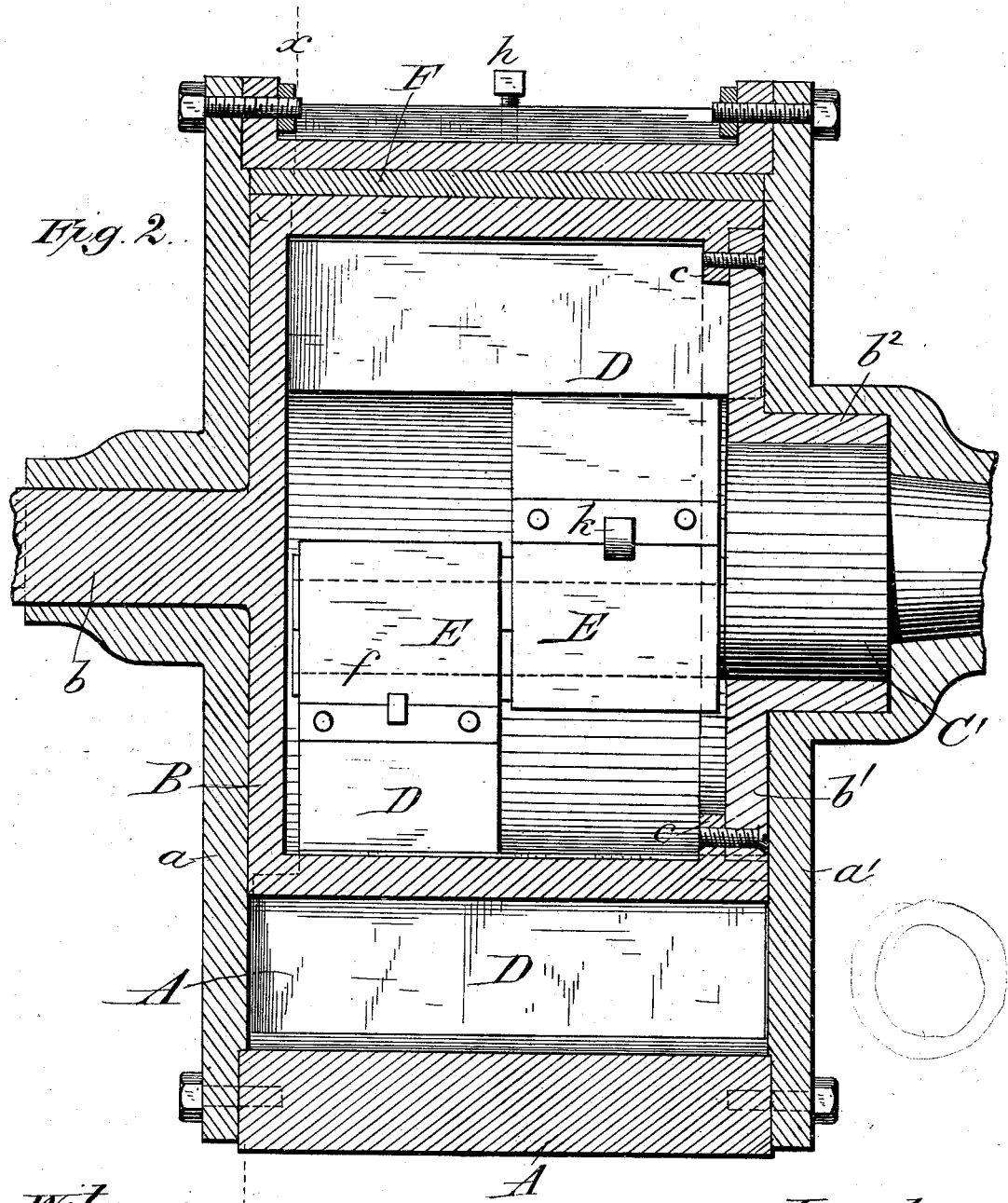

In the annexed drawings, which fully illustrate my invention, Figure 1 is a section on the line $x\ x$ of Fig. 2. Fig. 2 is a section on the line $y\ y$ of Fig. 1. Fig. 3 is a detail perspective view of a portion of the inner cylinder, showing valve or packing seats; and Fig. 4 is a detail perspective view of a piston and valve or packing-strips.

A represents a steam cylinder or case provided with removable heads $a\ a'$.

Within the case A is arranged an inner revolving cylinder, B, having a shaft, $b$, cast on one end and journaled in bearings in the head $a$ of the outer cylindrical case. This inner cylinder at its opposite end has a removable flanged head, $b'$, which is securely bolted to a flange, $c$, on the inner cylinder. The head $b'$ of the revolving cylinder B is provided with an outward-projecting sleeve, $b^2$, through which passes the enlarged end $C'$ of a fixed crank-shaft or pin, C, the outer end of which is securely fixed in the corresponding end or head, $a'$, of the outer case, A, and forms a bearing for said flanged head $b'$.

The inner cylinder, B, is slotted at convenient points, which slots $i\ i$ extend from end to end of the cylinder, and are provided with half-round grooves or bearings $d\ d$, forming seats for the reception of the rocking valves or packing-strips $e\ e$, through which pass the sliding or swinging pistons D D.

The pistons D are provided at their inner ends with adjustable boxes E E, that surround the crank-pin C, upon which they revolve. These boxes are adjustably secured within the straps $f\ f$ by means of the keys $k$ and nuts $m$.

It will be observed that the crank-pin C is located concentrically with the outer cylindrical case, A, and is excentric to the inclosed revolving cylinder B, which latter is eccentric to the outer case. When steam or other fluid is introduced through either port $g$ in the outer case it acts upon the projecting end of the adjacent piston D, causing the cylinder B to revolve in its bearings and carry therewith the shaft $b$. As the inner cylinder revolves the pistons D D move in the openings through the packing-strips or valves $e\ e$, which thus have imparted to them a semi-rotary movement in their seats $d\ d$, thereby preserving a close joint, and by closing the openings $i\ i$ leading to the interior of the inner cylinder prevent the access of steam thereto, the port $g$ opposite that where the steam entered acting as an exhaust when uncovered by the end of the piston.

Within the outer case, at its top, is arranged a plate, F, that is adjustably secured in place by means of a screw-bolt, $h$, by turning which the plate may be adjusted toward or from the revolving cylinder B, so as to form a close or steam-tight joint with the periphery of the same, and yet allow sufficient space for it to pass without undue friction.

The outer ends of the pistons D D, projecting through the slots or openings in the rocking valves or packing-strips $e\ e$, are equal in breadth to the extreme length of the inner cylinder, and by reason of their arrangement with relation to the inner cylinder and their mode of attachment to the crank-pin C, as described, may be readily adjusted, so as to always revolve in close contact with the inner surface of the outer cylindrical case, but without coming in frictional contact therewith. A steam-tight joint is thus constantly maintained between the pistons and outer case without the usual necessity of employing packing, and without liability of cutting or abrading the inner surface of said cylindrical case. This result is attained by the facility of adjustment possessed by the pistons, it being possible to so adjust them by means of the keys $k$ and nuts $m$ that the centrifugal force exerted by the revolution of the inner cylinder will fail to throw the ends of the pistons in forcible contact with the inner surface of the outer case. As the inner cylinder revolves the swinging motion of the pistons in and out, owing to their being journaled eccentrically with relation to said inner cylinder, and their consequent contact with the steam in the outer cylinder, not only lubricates their edges by the condensation of steam thereon, so as to obviate frictional wear of the same against the inner surfaces of the outer cylinder-heads, but also communicates a similar lubricant effect to the contiguous surfaces of the outer and inner cylinder-heads, thus preventing wear of the same. The great difficulties heretofore experienced in rotary engines resulting from frictional wear and cutting of the ends of the inner revolving cylinder upon the heads of the outer case are thus obviated in a simple and effective manner.

It will be observed that the thickness of the sides of the outer case, A, diminishes gradually above the ports $g$, as shown by comparison with the dotted line shown in Fig. 1, so that the lower surface of the projecting plate F, while preserving a close joint with the inner cylinder to prevent the passage of steam, will not come in contact with or obstruct the passage of the pistons in their revolution with said inner cylinder. This construction is also deemed preferable on account of economy, and because a vent is thereby afforded for the escape of steam from before the piston after it has passed the exhaust-port in its upward movement; but, if desired, the cylinder or case A may be made of uniform thickness, except that a recess would then be required for the reception of the adjustable plate.

In the drawings I have shown only two pistons, but three or more may be employed in like manner, if desired. These pistons, as illustrated in Fig. 2, are of such breadth at their outer ends that each one fills the opening between the packing-strips $e$ $e$ and extends completely across the space between the outer cylinder-heads. At their inner ends, however, their width is diminished on opposite sides for facility of attachment to the crank-pin, and so as to afford them a proper clearance in their revolutions about the same.

It is obvious that the apparatus may be used as a pump or meter as well as an engine; or the inner cylinders of two engines may be connected with the same shaft, so that when one is employed as a pump it may be driven with the power supplied by the other. This engine may also be used as a water-motor with good results.

The principal objections to rotary engines as heretofore constructed have been the inability to properly lubricate the ends of the revolving or inner cylinder, and also to compensate for the wear of the pistons, and thereby prevent injury to the outer case from friction of the working parts against the same. These difficulties are successfully overcome by my improvements, as above described. The wear of the outer case, usually resulting from the frictional contact therewith of the pistons and inner cylinder-heads, is obviated and equalized by the nice adjustment of which said pistons are capable, and the consequent utilization as a lubricant of the moisture of the condensed steam.

Having thus described my invention, what I claim as new, and desire to secure by Letters Patent, is—

1. In a rotary engine, the combination, with the outer case, A, having suitable ports, and the inner slotted cylinder, B, journaled eccentrically within said case and provided with adjustable pistons D D, of a fixed pin for the attachment of the piston-boxes, said pin consisting of the shaft C, concentric with the outer case and having an enlarged eccentric head, C', concentric with the inner cylinder, said head C' being detachably connected with the outer case and adapted to form a bearing for one head of the inner cylinder, substantially as shown and described.

2. In a rotary engine, the combination of the outer chambered case, A, having ports $g$ $g$, inner slotted cylinder, B, journaled eccentrically within said case, fixed crank-pin C, having an eccentric head or bearing, C', adjustable pistons D D, journaled on the shaft of said pin concentrically with the outer case and eccentrically with the inner cylinder, and the adjustable plate or abutment F, arranged at the upper chambered portion of the outer case, substantially as shown and described.

In testimony whereof I affix my signature in presence of two witnesses.

HENRY WINDSOR POTTER.

Witnesses:
A. R. BROWN,
J. C. TASKER.